United States Patent [19]

Fritze et al.

[11] 3,887,513

[45] June 3, 1975

[54] NON-AQUEOUS PRINTING INK

[75] Inventors: Helmut Fritze, Wiesbaden; Kurt Hultzsch, Wiesbaden-Biebrich; Hans-Jürgen Tietz, Langenhain, all of Germany

[73] Assignee: Hoechst Aktiengesellschaft, Frankfurt, Germany

[22] Filed: Mar. 26, 1973

[21] Appl. No.: 345,117

[30] Foreign Application Priority Data
Mar. 29, 1972 Germany................................ 2215234
Mar. 29, 1972 Germany................................ 2215267

[52] U.S. Cl................ 260/33.6 UA; 106/20; 106/30; 260/27; 260/78.5 BB; 260/82
[51] Int. Cl.............................................. C08f 45/28
[58] Field of Search.............. 260/78.5 BB, 80.8, 82, 260/88.1 PC, 33.6 UA; 106/20

[56] References Cited
UNITED STATES PATENTS

| | | | |
|---|---|---|---|
| 2,039,243 | 4/1936 | Krzikalla | 106/20 |
| 2,471,818 | 5/1949 | Hunter | 260/78.5 BB |
| 2,581,335 | 1/1952 | Earhart | 106/20 |
| 2,621,169 | 12/1952 | Robinette | 260/80.8 |
| 2,647,886 | 8/1953 | Seymour | 260/78.5 BB |
| 3,379,702 | 4/1968 | Spivey | 260/80.8 |
| 3,444,151 | 5/1969 | Verdol | 260/80.8 |
| 3,775,381 | 11/1973 | Hayashi | 260/82 |

*Primary Examiner*—Joseph L. Schofer
*Assistant Examiner*—Paul R. Michl
*Attorney, Agent, or Firm*—Littlepage, Quaintance, Murphy & Dobyns

[57] ABSTRACT

Non-aqueous printing ink, particularly a photogravure ink in which the binding agent contains as an essential ingredient a compound selected from the group consisting of a. a salt of a polymerisation resin having units of carboxylic groups, an average molecular weight in the range of 500 to 5000 an a saponification number in the range from 10 to 370 and b. a combination of such salt with a reaction product of colophony with at most dibasic olefinically unsaturated carboxylic acids, 2 to 60% of the units of carboxylic groups of the polymerisation resin being bound to a cation of group I of the Periodic Table or an ammonium ion in which 0 to 4 hydrogen atoms are bound to the nitrogen atom, or to a combination thereof and the units of carboxylic groups which are not present as a salt being free or at least in part esterified by an alcohol.

15 Claims, No Drawings

NON-AQUEOUS PRINTING INK

This invention relates to printing inks and in particular to inks for rotogravure printing.

Printing inks consist basically of pigment, binder and solvent. The suitability of a particular ink for printing depends upon the properties that flow from interaction between these components. The main function of the binder is to fix the pigment to the substrate upon which printing is to occur. In addition, it serves to facilitate and improve dispersion of the pigment particles during preparation of the ink. Furthermore the binder should keep the pigment particles in suspension and adjust the fluidity of the ink to the required degree for the given printing process. The binder should also envelop the pigment effectively during the printing process and in the printing films.

Dispersing power and the capacity to wet the pigment are determined to a great extent by the chemical structure of the resins, a certain affinity between resin and pigment being an advantage. Important properties of the printed colour films, such as the depth of colour, gloss and glaze, are effected by this factor although these properties are also, to a large extent, influenced by whether and to what extent the binder migrates into the pores and capillaries of the absorbent substrate, e.g. the paper, and thereby becomes unable to envelop the pigment particles sufficiently. This behaviour of the system of binder and pigment is defined by the term "stand on the paper" and, the better the stand on the paper of the printing ink the less the tendency of the binder to penetrate the paper and optically change the back of the paper.

Lastly, drying should proceed as rapidly as possible, i.e. the solvents used must be rapidly and completely removed in the course of the printing process. In rotogravure printing processes, in which the binders used are solutions of resins in suitable solvents, preferably in toluene, drying is a purely physical process of evaporation of volatile solvents, particularly toluene.

Resins for rotogravure printing inks have previously been produced from colophony by reacting it with other components such as phenol-formaldehyde resins or esterifying agents. Although these inks fulfil the above mentioned requirements to a large extent, it is becoming increasingly difficult to produce them in sufficient quantities due to the increasing shortage of colophony. Printing inks have been produced from resins on a purely synthetic basis; however such inks generally do not have the well-balanced properties of inks based on high-quality colophony resins. In particular, when such synthetic resins have been applied to paper which has not been machine-coated and is therefore hughly absorbent, they display poor stand on the paper which renders them unsatisfactory for intaglio printing processes. The dispersing power and hence the gloss and glaze are generally also unsatisfactory in rotogravure printing inks produced from synthetic printing resins.

Highly soluble resins for rotogravure printing can be produced, for example, by free radical polymerisation. Polystyrene is highly soluble in toluene but has the disadvantage of drying too slowly and having only a low affinity for pigments. Copolymers produced from the styrene and/or styrene derivatives and from maleic anhydride and/or acrylic acid or derivatives thereof dry more rapidly and have a greater affinity for pigments but have poor stand on paper when used in rotogravure printing inks.

The production of highly soluble resins for rotogravure printing can also be carried out, for example, by ionic polymerisation of suitable polymerisable monomers, using unsaturated hydrocarbons as starting materials.

A suitable source of raw materials containing such polymerisable monomers is certain petroleum hydrocarbon fractions boiling in the range of $-20°C$ to $280°C$. Such mixtures, optionally with the addition of other monomers, can be polymerised in the presence of Friedel-Crafts catalysts or acids such as sulphuric acid. These resins, however, are not well suited for use as binders for printing inks, in particular for rotogravure printing, on account of their inadequate polarity and hence low affinity for pigments. Although these resins can be rendered somewhat more suitable for the purpose by subsequently reacting them with a compound such as maleic anhydride to effect the addition of unsaturated dicarboxylic acid units to the molecule, optionally in the presence of peroxide, it is still desirable to improve upon the quality of printing inks produced in this way.

One known process for subsequently introducing a dicarboxylic acid residue is, for example, based on the use of free radical or ionically polymerised starting materials which contain active hydrogen and consists of reacting them with a mixture of stryrene and maleic anhydride at temperature above $120°C$. In this way styrene and maleic anhydride can be introduced simultaneously into the polymer used as starting material.

The suitability of resins for use in printing inks can be improved by salt formation of acid groups with polyvalent metals. In particular metals of the second group of the Periodic System such as zinc and/or calcium, may form salts preferably by resinate formation of products which contain colophony, optionally with simultaneous esterification with polyhydric alcohols. To achieve particularly advantageous results, the metals are in many cases used in relatively large quantities, approximately equivalent to the number of acid groups present. The molecular weight and melting point of the resins are increased by this method. However, the high proportion of salt groups may adversely affect the viscosity and hence the possibility of working up the products. This method is also carried out with modified petroleum hydrocarbon resins which still contain anhydride groups although relatively high temperatures of about $260°C$ are required with the result that the resins may decompose and darken in colour. This decomposition may cause an even further decrease in the viscosity which may drop to that of the resin used as starting material or even lower.

Printing inks based on inorganic salts of a carboxyl-containing aliphatic $\alpha$-olefin polymer with monovalent cations, water and pigments are also known. These polymers must be rendered water-soluble by salt formation. In general, 80 to 90% of the carboxyl groups, which amount to 18 to 22 mols % of the copolymer, must be neutralised by salt formation to render the polymers sufficiently soluble.

We have now developed a binder for use in a non-aqueous printing ink which does not have the above mentioned disadvantages and possesses optimum properties so rendering it particularly suitable for toluene rotogravure printing.

The invention provides a binder for use in a non-aqueous printing ink comprising a salt of a polymerisation resin which contains carboxyl groups and which has an average molecular weight of 500 to 5000 and a saponification number of 10 to 370 and in which 2 to 60% of the carboxyl group units are reacted with cations of the first group of the Periodic System and/or with substituted or unsubstituted ammonium or quaternary ammonium ions to form the corresponding salts.

By "carboxyl group units" we mean derivatives which contain or form carboxyl groups, such as compounds which contain anhydride, ester, semiester or amide groups. The carboxyl groups are preferably vicinal carboxyl groups.

By "non-aqueous" medium we mean a medium which does not contain water and is not miscible with water.

The polymerisation resins may be produced in known manner, e.g. a) by free radical or cationic polymerisation of a1) monoolefins and optionally diolefins followed by reaction with a2) unsaturated components which contain carboxyl group units, e.g. by means of heat, high-energy radiation such as electron beams or ultraviolet radiation, or followed by the attachment of unsaturated acids or their anhydride or esters by a radical reaction, e.g. by means of peroxides, and/or (b) by copolymerisation of monoolefins and optionally diolefins with unsaturated components which contain carboxyl groups. Method (b) may be carried out e.g. by free radical polymerisation.

The monomers used for producing the polymerisation resins by free radical polymerisation and especially those used for cationic polymerisation are mainly those obtained from hydrocarbon fractions rich in polymerisable hydrocarbons. These occur in the petroleum fractions boiling within the range of $-20°$ to $280°C$ and are obtained e.g. by thermal cracking such as steam cracking. Typical suitable aromatic vinyl compounds are styrene and/or its derivatives such as methyl styrene, the various vinyl toluenes and aliphatic or cyclic olefins and/or diolefins such as monoolefins which contain 2 to 9 C-atoms, e.g. propylene, butylene, isobutylene, octene, butadiene, isoprene, cyclopentadiene and dicyclopentadiene. For cationic polymerisation, indene and its derivatives such as alkyl indenes and especially methyl indine are also suitable whereas for free radical polymerisation cyclohexadiene, cycloheptadiene, vinyl pyridine and vinyl pyrolidine are suitable. Resins which have been prepared by radical or cationic polymerisation of synthetic mixtures of the above mentioned monomers are also suitable. In the case of resins produced by free radical polymerisation, the component which contains the carboxyl groups, preferably an unsaturated mono- and/or dicarboxylic acid, is either incorporated by polymerisation or attached subsequently.

The polymers are preferably produced from monomers in which the unsaturated compounds which contain one or more of the aforesaid carboxyl group units or carboxyl groups, in particular anhydrides of vicinal carboxyl groups, are incorporated subsequently. Particularly suitable monomers which contain carboxyl group units are e.g. maleic acid, maleic anhydride and maleic acid semiesters of monohydric alcohols, acrylic or methacrylic acid, fumaric acid, citraconic acid, itaconic acid, crotonic acid and tetrahydrophthalic acid and optionally also halogen derivatives or saponifiable derivatives of these acids or anhydrides, used either singly or as mixtures.

The carboxyl groups may also be introduced in the vicinal position by, for example, reacting the carboxyl group of trimellitic anhydride with ethylene oxide, carefully esterifying this reaction product with acrylic acid under mild conditions and then incorporating the resulting unsaturated ester which contains anhydride groups into the resin molecule by a process of copolymerisation.

At least 50% of the monomers in the copolymers used according to the invention should be aromatic and/or cycloaliphatic.

The polymers may also be in the form of telomers. It is preferred to use those olefin and particularly styrene-maleic anhydride telomers in which the proportion of maleic anhydride to styrene is from 1:2 to 1:20, preferably from 1:2 to 1:8. The following telomers are mentioned as examples of suitable starting materials: 1) telomers of maleic anhydride and styrene (molar ratio 1:2, 1:3, 1:5, 1:8), 2) telomers of acrylic acid and styrene (molar ratio 1:3) and 3) telomers of maleic anhydride, styrene and α-methyl styrene (molar ratio 1:1:1), the telomers mentioned under 1) being preferred.

If the basic substance of the resin used as starting material is produced by ionic polymerisation, e.g. anionic or cationic polymerisation, then the acid component is generally introduced subsequently. In one known method of subsequent introducing the acid component, for example, the free radically polymerised or ionically polymerised basic substances which contain active hydrogen atoms are reacting with a mixture of styrene and maleic anhydride at temperatures above $120°C$. By this method, styrene and maleic anhydride can be introduced simultaneously into the polymer. Other methods enable maleic anhydride to be introduced alone.

The salts used according to the invention have a wide range of solubility in non-aqueous organic solvents of the kind used for printing inks, e.g. aromatic solvents such as toluene, but also in aliphatic solvents such as petroleum hydrocarbons or in mineral oils and especially in toluene which is used for rotogravure printing, and in some cases they are even soluble in all proportions.

The solution viscosity of the salts contained in the printing inks according to the invention should lie within certain limits. Viscosities of 10 to 2,000 cP and preferably 15 to 1,000 cP (50% in toluene at $20°C$) are generally suitable for toluene rotogravure printings. This viscosity can be controlled by the degree of salt formation. The softening point of the salts should be between $50°C$ and $150°C$ (capillary method).

Printing inks prepared with such binders have improved properties for the printing process, especially stand on absorbent paper, affinity for pigments, gloss and glaze. This was surprising. In the known processes involving salt formation with divalent ions and in the products produced by them there was no intention of influencing the stand on paper, nor could such a property be influenced in these products. Still less was it to be expected that an improvement in the printing properties could be achieved by salt formation with monovalent ions which, in contrast to salt formation with divalent cations, does not result in any increase in molecular size. The effect of salt formation with monovalent ions is all the more surprising in view of the fact that in the process according to the invention the monovalent cations are reacted in much less than equivalent amounts with the acid groups and in some cases only in minor quantities. The particular proportion of carboxyl group units to be saponified according to the invention was chosen on the basis of the finding that salt formation of a high percentage of carboxyl group units generally results in too great an increase in viscosity and does not improve the properties for printing purposes. In addition, carboxyl group units react more readily with cations of the first group.

The proportion of reacted carboxyl groups to the total quantitiy of carboxyl groups present (including the derivatives which contain carboxyl groups) will hereinafter also be referred to as "degree of neutralisation $\alpha$". This is defined as $$\alpha = \frac{\text{mols of carboxylate groups}}{n \text{ (mols of carboxyl group units)}}$$

where $n$ is the functionality of the carboxyl group units. In the case of anhydride groups, $n = 2$.

Salt formation is carried out by reacting the polymersation resins with a reactive compound of a metal of group I of the periodic system or with $NH_3$ or an amine. Some of the free carboxyl groups and/or of the derivatives which form carboxyl groups are thereby converted into the salt form.

Salt formation may be carried out in solution. The metal compound, amine compounds or ammonium compound may also be present in the form of an aqueous or alcoholic solution.

The unsaponified resin need not be available in a solid form before the process of salt formation. Resins which are produced by radical telomerisation are frequently obtained in the form of solutions in aromatic solvents or alcohols. Such solutions can be directly reacted with an aqueous or alcoholic solution of the metal compound, amine compound or ammonium compound.

The reactive compounds of monovalent cations may be, for example, their acetates or formates, but preferably hydroxides, carbonates and alcohols of metals of group I of the Periodic System, used either singly or as mixtures, e.g. of lithium, sodium and potassium. The amines used may be aliphatic or cycloaliphatic nitrogen compounds, e.g. primary, secondary or tertiary amines optionally substituted by one or more alkyl groups, or polyamines such as ethylenediamine, diethylenetriamine, triethylene tetramine or the like or quaternary ammonium bases. The aliphatic radical of these compounds may also contain oxygen in an ether-type bond. In the case of a cycloaliphatic amine, the nitrogen atom may be incorporated either outside the ring or in the ring itself. Morpholine is an example of a cycloaliphatic amine in which the oxygen atom and the amine nitrogen atom are situated in the cycloaliphatic ring.

The advantage of carrying out the reaction in solution is that resins are not subjected to excessive heat. For example, the temperature employed for salt formation should not exceed 200°C in order not to have a deleterious effect on the end products. Salt formation may, however, also be carried out in a solvent-free melt, e.g. with salts of volatile carboxylic acids or of carbonic acids, but higher reaction temperatures must then be employed and any carbon dioxide or carboxylic acid liberated removed. At the same time, depolymerisation of the polymer resins by heat must be prevented.

The preferred method of carrying out the reaction is a two-phase solution reaction. In this method, the unsaponified resin is dissolved in a solvent such as toluene, xylene or a mixture of aromatic solvents and treated for some time with an aqueous solution of the cation compound. After the reaction, the solvent and water are removed from the saponified resin, e.g. by distillation. In cases where ammonium salts and certain alkyl ammonium salts are present, drying must be carried out carefully to prevent amide formation.

The salts used according to the invention and the polymers from which they are obtained may also be modified by additional operations.

The molecular weight of the resins used according to the invention may be increased in known manner by esterifying those carboxyl group units not used for salt formation by means of polyhydric alcohols such as ethylene glycol, propylene glycol, glycerol, pentaerythritol or the like. These alcohols, and occasionally also monohydric alcohols, may be added to the system during any phase of salt formation. They are preferably added together with the solution of the alkali metal compound or of the salt or amine compound. The quantity added may vary within wide limits but should generally be a subequivalent amount, based on the unreacted carboxyl group units.

The quantity of metal compound used is such that the degree of neutralisation $\alpha$ is from 0.02 to 0.6 after the reaction. In cases where the unsaponified resin have a very low viscosity, e.g. 10 to 50 cP, the degree of neutralisation is preferably from 0.1 to 0.6, but if the resin used as starting material already has a relatively high viscosity, e.g. higher than 50 cP (50% in toluene/20°C), then the degree of neutralisation is preferably from 0.02 to 0.3 for resins used for toluene intaglio printing on account of the increase in viscosity with incerasing degree of neutralisation.

If desired, colophony may be added to the resin before it is reacted to form the salt. This has the advantage that any unreacted monomeric $\alpha$, $\beta$-olefinically unsaturated monocarboxylic and/or dicarboxylic acids left in the resin can be converted into higher molecular weight products by adduct formation with resin acids before the process of salt formation is carried out. These reaction products may be present in the printing ink or form a mixture with the saponified resins. To ensure a quantitative reaction between the colophony and monomeric $\alpha$, $\beta$-unsaturated monocarboxylic and/or dicarboxylic acid, the reaction should be carried out for the necessary time and under the temperature conditions required for adduct formation before salt formation is carried out.

The quantity of colophony used should be at least equivalent to the molar quantity of unreacted free unsaturated acid component in the polymerisation resin but may be higher, for example by up to one part by weight, based on the weight of polymerisation resin, because limited quantities of unreacted colophony have been found occasionally to improve the properties of printing inks produced from the resin.

The resins used according to the invention which are modified by salt formation are distinguished from resins which do not contain salt groups by their increased melting or softening points. Owing to their higher softening points, the resins used according to the invention are also suitable for printing on high-speed printing machines in which the print is dried at elevated temperatures. This is particularly important for the application of the product according to the invention. As comparison tests have shown, the saponification of carboxyl groups plays a particularly important role for the stand on paper, penetration of the paper being observed in most of the test where other inks were used for comparison. When the resins according to the invention are used, the glass is three to four times higher than that obtained with comparison resins.

The use of the resins as binders for printing inks used for toluene intaglio printing is preferred on the basis of their good solubility, especially in aromatic solvents.

The following Examples illustrate the invention, in all of the examples the yields obtained are 98 to 100%.

EXAMPLE 1

The quantity of normal sodium hydroxide solution required for a degree of neutralisation $\alpha = 0.1$ is added directly to an approximately 25 to 50% solution in xylene of a telomer (softening point 100°C, viscosity 170 cP, saponification No. 101) prepared by free radical telomerisation of styrene and maleic anhydride in a molar ratio of about 8:1 in the presence of cumene as telogen. The reaction mixture is then boiled under reflux for 2 hours. The water is removed in a water separator while the xylene is returned, and the remainder of the solvent is distilled off in a water jet vacuum at temperatures of up to 200°C. A clear resin which contains salt groups is obtained. It has a softening point of 130°C and a viscosity of 490 cP and the degree of neutralisation $\alpha = 0.1$. It is made up into a binder for printing inks as described hereinafter.

EXAMPLE 2

150 g of a telomer (softening point 110°C, saponification No. 134, viscosity 145 cP) which has been prepared by the polymerisation of styrene, vinyl toluene, $\alpha$-methyl styrene, indine and maleic anhdride (molar ratio of anhydride to the sum of the other components $= 1:(6-7)$ are dissolved in 150 g of xylene. 35.9 ml of normal potassium hydroxide solution are added and the mixture is heated for 2 hours. The water is removed while the xylene is returned and the xylene is then distilled off under a vacuum at temperatures of up to 200°C. A clear resin with softening 125°C, viscosity 400 cP and $\alpha = 0.1$ is obtained. This is worked up into a binder for printing inks as described hereinafter.

EXAMPLE 3

136.5 g of a telomer of styrene and maleic anhydride (0.3 equivalents) (molar ratio approximately 8:1, softening point 103°C, saponification No. 123, viscosity 72 cP). 136.5 g of xylene and 3.6 g of 100% sodium hydroxide solution are heated and boiled under reflux for 2 hours. The volatile substances are distilled off and the resin is dried under vacuum at 205°C. The resin has a softening point of 115°C and a viscosity of 710 cP. The degree of neutralisation $\alpha = 0.3$. The resin is worked up as described hereinafter.

EXAMPLE 4

300 g of the telomer used as starting material in example 3 are dissolved in 300 g of xylene. 8.1 g of a 32.6% sodium hydroxide solution are added to obtain a degree of neutralisation $\alpha$ of 0.1. 5 g of propylene glycol are also added. After boiling under reflux for 2 hours, the solvent is distilled off in a water jet vacuum at temperatures of up to 205°C. The resin has a softening point of 112°C and a viscosity of 118 cP. It is worked up as described hereinafter.

EXAMPLE 5

136.5 g of the telomer used as starting material in Example 3 are dissolved in 136.5 g of butanol and 273 g of xylene. 0.71 g of lithium hydroxide and 25 ml of water are added to obtain a degree of neutralisation of 0.1. After 2 hours boiling under reflux, the water is removed by distillation and the solvent returned. The solvent is then distilled off in a water jet vacuum at temperatures of up to 200°C. The resin has a softening point of 106°C and viscosity of 78 cP. It is worked up as described hereinafter.

EXAMPLE 6

200 g of the telomer used as starting material in Example 3 are dissolved in 200 g of toluene. 3 g of 25% aqueous ammonia are added to the cold solution to obtain a degree of neutralisation $\alpha$ of 0.1. After carefully heating to boiling point, the water is removed by distillation while the solvent is returned. To determine the properties of the resin, a small portion of resin solution is carefully dried. A resin with the following properties is obtained: softening point 103°C, viscosity 88 cP.

The remainder of the solution in toluene is used directly for the production of a toluene intaglio printing ink. It is worked up as described hereinafter.

EXAMPLE 7

200 g of a cotelomer of styrene and maleic anhydride (molar ratio of styrene:maleic anhydride = 8:1, softening point 113°C, viscosity 155 cP, saponification No. 125) are dissolved in 200 g of xylene. 3.61 g of 33% potassium hydroxide solution and 2.58 g of 33% sodium hydroxide solution are added. These together result in a degree of neutralisation $\alpha$ of 0.1. After boiling for 3 hours under reflux, the solvent is distilled off in a water jet vacuum at temperatures of up to 210°C. The resin obtained has a softening point of 125°C and a viscosity of 543 cP. It is worked up as described hereinafter.

EXAMPLE 8

The resin used as starting material is a telomer of styrene, maleic anhydride and acrylic acid (molar ratio of acid and ahydride to styrene is 1:8, the molar ratio of acid to anhydride is 3:2). The telomer has a softening point of 99°C, a saponification number of 87 and a viscosity of 157 cP. 350 g of this resin are dissolved in 350 g of xylene, and 54.6 ml of normal potassium hydroxide solution are added. This quantity corresponds to a degree of neutralisation $\alpha$ of 0.1. The mixture is treated as described in Example 3. A resin with softening point 107°C and viscosity of 300 cP is obtained. It is worked up as described hereinafter.

EXAMPLE 9

The resin used as starting material is a product containing anhydride groups which has been obtained by the addition of maleic anhydride to a cotelomer of styrene and vinyl toluene (molar ratio of anhydride to the sum of vinyl monomers = 1 : approximately 12) prepared by radical telomerisation, the addition reaction being carried out at about 175°C, using a reaction mixture to which peroxide has been added. The resin is dissolved in xylene and this solution is washed twice with hot distilled water to remove unreacted maleic anhydride. The resulting resin has a softening point of 118°C, saponification No. 60 and viscosity of 55 cP (50% in toluene/20°C).

EXAMPLE 10

150 g of the resin form Example 3 and 30 g of colophony are together dissolved in 350 g of toluene. When both components have dissolved, 120 ml of normal sodium hydroxide solution are added and the process is continued as described in Example 3. The resulting resin has a softening point of 115°C and viscosity of 82 cP.

EXAMPLE 11

The resin used as starting material is an adduct of 2% of maleic anhydride and a hydrocarbon resin (softening point 95°C, viscosity 20 cP) which has been obtained by cationic polymerisation of petroleum hydrocarbon fractions consisting of styrene, α-methyl styrene, vinyl toluene and indene. The adduct has a softening point of 110°C, a saponification No. of 24 and a viscosity of 29 cP.

150 g of this adduct are dissolved in 300 ml of xylene. 3.2 ml of normal aqueous potassium hydroxide solution are added, this quantity corresponding to a degree of neutralisation α of 0.05. The mixture is kept at reflux for 2 hours and the volatile constituents are then distilled off in a water jet vacuum at temperatures of up to 205°C. The properties of the resulting salt are indicated in table 1. It is worked up as a binder for printing inks as described hereinafter.

EXAMPLE 12

The process is carried out in the same way as in Example 1 but instead of potassium hydroxide, only the quantity of normal sodium hydroxide solution corresponding to a degree of neutralisation α of 0.15 is reacted. The properties of the resulting salt are indicated in table 1. The salt is worked up as binder for printing inks as described hereinafter.

EXAMPLES 13 and 14

The resin used as starting material is in each case an adduct of 2% of maleic anhydride and a hydrocarbon resin obtained from the same constituents as in Example 1 (softening point 117°C, viscosity 34 cP). This adduct, which has a viscosity of 41 cP, softening point of 120°C and saponification number of 23, is reacted as in Example 1 with the quantity of normal potassium hydroxide solution required to obtain in the first case a degree of neutralisation of 0.05 and in the second a degree of neutralisation of 0.15. The properties of the salts obtained are indicated in table 1. The salts are worked up as described hereinafter.

EXAMPLE 15

The resin used as starting material (softening point 94°C, viscosity 20 cP) was obtained by cationic polymerisation in the presence of boron trifluoride of petroleun hydrocarbon fractions which boil in the range of 110° to 190°C and contain the monomers styrene and α-methyl-indene. 1.5% by weight of maleic anhydride, based on 100 g of resin used as starting material, were added to this resin by a thermal addition reaction.

150 g of the resulting resin which has been modified with maleic anhydride (softening point 98°C, saponification number 33.6, viscosity 25 cP) are melted together with 15 g of colophony and the melt is kept at 150° to 170°C for 30 minutes. This resin is dissolved in 300 g of xylene and reacted in the same way as in example 1 but using 54 ml of normal sodium hydroxide solution. The properties of the resulting resin are indicated in table 1. The resin is worked up as a binder for printing inks as described hereinafter.

Table 1

| Example | Degree of neutralisation α | Softening point of the salts °C | Viscosity cP |
|---|---|---|---|
| 11 | 0.05 | 108 | 29 |
| 12 | 0.15 | 112 | 31 |
| 13 | 0.05 | 120 | 44 |
| 14 | 0.15 | 121 | 47 |
| 15 | 0.1 | 109 | 30 |

Method of working up the resins

To demonstrate the special advantages of the binders used according to the invention, they were made up into printing inks which were then tested.

Preparation of toluene intaglio printing inks

Solutions in toluene are prepared from the resins which contain salt groups described in Examples 1 to 10 and for comparison from the resins used as starting materials in these examples. The solution is adjusted to an outflow time of 17 to 20 seconds in a DIN-4 cup. 14 g of pigment red 57 (C.I.) of a moderately dispersible pigment are added to 150 g of this solution. The mixture is dispersed in a suitable apparatus for 30 minutes. Preparation of the ink is completed by adjusting the dispersion to an outflow time of 17 to 20 seconds by a further addition of toluene.

Test for printing properties

The gloss of the intaglio printing inks produced from the resins was compared with that of inks obtained with the corresponding resins used as starting materials. Penetration of the inks through the paper was observed.

All the printing inks are applied to paper weighing 60 g/m² to produce layers with varying thicknesses, using drawing coils. The gloss is assessed by examining layers which have a thickness when wet of 24 μ produced by a single application. The results are summarised in the following table.

Table 2

| Ex- ample | Gloss | | Penetration of paper | |
|---|---|---|---|---|
| | modified resin | resin used as starting material (comparison example) | modified resin | resin used as starting material (comparison test) |
| 1 | 22 | 5 | no | yes |
| 2 | 17 | 5.5 | " | " |
| 3 | 18.5 | 9 | " | " |
| 4 | 21.5 | 8 | " | " |
| 5 | 26 | 7 | " | " |
| 6 | 30 | 7 | " | " |
| 7 | 21 | 8 | " | slight |
| 8 | 22 | 5.5 | " | yes |
| 9 | 28.5 | 6.5 | " | " |
| 10 | 21 | 7 | " | " |

Table 2-Continued

| Ex-ample | Gloss modified resin | Gloss resin used as starting material (comparison example) | Penetration of paper modified resin | Penetration of paper resin used as starting material (comparison test) |
| --- | --- | --- | --- | --- |
| 11 | 12 | 4.5 | " | yes |
| 12 | 29 | 4.0 | " | yes |
| 13 | 27 | 20 | " | slight |
| 14 | 28 | 20 | " | slight |
| 15 | 19 | 6 | " | yes |

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A non-aqueous ink comprising a binder, at least one pigment and a non-aqueous volatile solvent in which the binding agent contains as an essential ingredient a compound selected from the group consisting of
   a. a salt of a polymerization resin having units of carboxylic groups comprising a1) olefinically unsaturated monomers occurring in petroleum fractions boiling within the range from −20° to +280°C and a2) olefinically unsaturated at least monocarboxylic acid units having 3 to 8 carbon atoms, in a molar ratio of a1) : a2) = (2 to 20): 1, said salt having an average molecular weight in the range of 500 to 5000 and a saponification number in the range from 10 to 370 and
   b. a combination of such salt with a reaction product of colophony with at most dibasic olefinically unsaturated carboxylic acids, 2 to 60% of the units of carboxylic groups of the polymerixation resin being bound to a cation of group I of the Periodic Table or an ammonium ion in which 0 to 4 hydrogen atoms are bound to the nitrogen atom or to a combination thereof and the units of carboxylic groups which are not present as a salt being free or at least in part esterified by an alcohol.

2. Printing ink according to claim 1 wherein the polymerisation resin of component a) is a polymerisation product of at least one monomer containing at least one unit of a carboxylic group with at least one monoolefin or with a combination of at least one monoolefin with at least one diolefin.

3. Printing ink according to claim 1 wherein the polymerisation resin of component a) is the reaction product of at least one unsaturated compound containing at least one unit of a carboxylic group with a polymerisation product of at least one monoolefin or of a combination of at least one monoolefin with at least one diolefin.

4. Printing ink according to claim 1 wherein the units of carboxylic groups are derived from an at most dibasic carboxylic acid.

5. Printing ink according to claim 1 wherein the polymerisation resin of component a) has been prepared by a radical polymerisation.

6. Printing ink according to claim 1 wherein the polymerisation resin of component (a) has been prepared by a radical polymerisation of ($\alpha$) a compound selected from the group consisting of styrene and fractions obtained by steam cracking of petroleum with ($\beta$) maleic anhydride.

7. Printing ink according to claim 1 wherein the polymerisation resin of component (a) has been prepared by a cationic polymerisation under the influence of a Friedel-Craft's catalyst.

8. Printing ink according to claim 1 wherein component (a) is the salt of a resin containing vicinal carboxylic group units.

9. Printing ink according to claim 1 wherein the salt (a) has a viscosity in the range from 10 to 2000 centipoise.

10. Printing ink according to claim 1 wherein the degree of neutralization of component (a) is from 0.1 to 0.6 where the polymerisation resin has a viscosity of 10 to 50 centipoise, and wherein the degree of neutralization is in the range from 0.02 to 0.3 where the viscosity of the polymerisation resin is above 50 centipoise.

11. Printing ink as claimed in claim 1, which is a photogravure ink.

12. Printing ink as claimed in claim 11 wherein the binding agent is dissolved in toluene.

13. The printing ink of claim 1, in which at least 50% of the monomers in said binder are aromatic and/or cycloalyphatic.

14. The printing ink of claim 1, in which the quantity of colophony is at least equivalent to the molar quantity of unreacted unsaturated acid component in said binder.

15. Printing ink according to claim 1 wherein the alcohol used to esterify in part the carboxylic acid groups is a polyhydric alcohol.

* * * * *

UNITED STATES PATENT AND TRADEMARK OFFICE
CERTIFICATE OF CORRECTION

PATENT NO. : 3,887,513
DATED      : June 3, 1975
INVENTOR(S) : Helmut Fritze et al It is certified that error appears in the above-identified patent and that said Letters Patent are hereby corrected as shown below:

In the Abstract line 7, correct the spelling of "and"

In the Specification:

Column 1, line 52, correct the spelling of "highly"
Column 3, line 44, correct the spelling of "indene"
Column 6, line 36, correct the spelling of "increasing"
Column 7, line 38, correct the spelling of "anhydride"
Column 9, line 62, correct the spelling of "petroleum"

In the Claims:

Claim 1, line 1, before "ink" insert --printing--
         line 19, correct the spelling of "polymerization"

Signed and Sealed this seventh Day of October 1975

[SEAL]

Attest:

RUTH C. MASON
*Attesting Officer*

C. MARSHALL DANN
*Commissioner of Patents and Trademarks*